Patented Feb. 9, 1954

2,668,844

UNITED STATES PATENT OFFICE 2,668,844

O-($\beta,\beta,\beta$ - TRICHLOROTERTIARYBUTYL) O-(4-NITROPHENYL) ALKANEPHOSPHONATES Henry Tolkmith, Midland, Mich., assignor to The Dow Chemical Company, Midland, Mich., a corporation of Delaware No Drawing. Application April 21, 1953, Serial No. 350,228

3 Claims. (Cl. 260—461)

The present invention is directed to O-($\beta,\beta,\beta$-trichlorotertiarybutyl) O-(4-nitrophenyl) alkanephosphonates of the formula

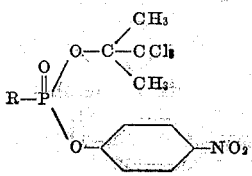

In this and succeeding formulae, R represents methyl or ethyl. These compounds are viscous oils, somewhat soluble in many organic solvents and substantially insoluble in water. They are of value as intermediates for the preparation of more complex phosphorus derivatives and as toxic constituents of parasiticide compositions.

The new compounds may be prepared by reacting one molecular proportion of $\beta,\beta,\beta$-trichlorotertiarybutanol with one molecular proportion of an O-(4-nitrophenyl) alkanephosphonic chloride of the formula

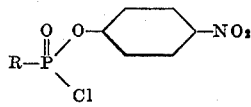

in an inert organic solvent such as diethyl ether or benzene. The reaction is carried out in the presence of a hydrogen chloride acceptor such as pyridine.

In carrying out the reaction, the $\beta,\beta,\beta$-trichlorotertiarybutanol and pyridine are dispersed in the solvent and the resulting mixture added with stirring to the O-(4-nitrophenyl) alkanephosphonic chloride dispersed in the same solvent. The reaction mixture is thereafter heated for a period of time at a temperature of from 30° to 80° C. In practice, it is sometimes convenient to operate at the boiling temperature of the reaction mixture and under reflux. Upon completion of the reaction, the mixture may be filtered and the filtrate distilled under reduced pressure at gradually increasing temperatures to separate low boiling constituents and to obtain as a residue the desired O-($\beta,\beta,\beta$-trichlorotertiarybutyl) O-(4-nitrophenyl) alkanephosphonate. Distillation temperatures substantially in excess of 150° C. for any appreciable period of time should be avoided, as the desired products have a tendency to decompose at such temperature.

The O-(4-nitrophenyl) alkanephosphonic chlorides employed as starting materials in the above-described method may be prepared by reacting one molecular proportion of 4-nitrophenol with at least one molecular proportion of an alkanephosphonic dichloride of the formula

in an inert organic solvent. The reaction is carried out in the presence of a hydrogen chloride acceptor such as pyridine. In carrying out the reaction, the 4-nitrophenol and the hydrogen chloride acceptor are dispersed in the solvent and the resulting mixture added portionwise with stirring to the alkanephosphonic dichloride dispersed in the same solvent. The mixture is then heated for a period of time at a temperature of from 35° to 80° C. to complete the reaction. The reaction takes place smoothly at the temperature range of from 20° to 80° C. and at a rate which varies directly with the employed temperature. The reaction is somewhat exothermic, temperature being controlled by the rate of contacting the reactants as well as by the addition and subtraction of heat, if required. Upon completion of the reaction, the mixture may be filtered and the filtrate concentrated by distillation under reduced pressure to obtain as a residue the desired O-(4-nitrophenyl) alkanephosphonic chloride. Distillation temperatures substantially in excess of 150° C. for any appreciable period of time should not be employed as the desired products have a tendency to decompose at such temperature. O-(4-nitrophenyl) methanephosphonic chloride and O-(4-nitrophenyl) ethanephosphonic chloride are viscous oils having a density of 1.4490 and 1.4107, respectively, at 20° C. These compounds and the described method for their production constitute the subject matter of my copending application Serial No. 203,758, filed December 30, 1950.

*Example 1.—O-($\beta,\beta,\beta$-trichlorotertiarybutyl) O-4-(nitrophenyl) methanephosphonate*

16.2 grams (0.091 mole) of $\beta,\beta,\beta$-trichlorotertiarybutanol and 9 grams (0.114 mole) of pyridine were dispersed in 50 milliliters of diethyl ether and the resulting mixture added with stirring to 20.9 grams (0.089 mole) of O-(4-nitrophenyl) methanephosphonic chloride dispersed in 150 milliliters of diethyl ether. The mixture was thereafter heated for 2.5 hours at the boiling temperature and under reflux. At the end of this period, the mixture was filtered and the filtrate distilled under reduced pressure to a temperature up to 85° C. to obtain as a residue an O - ($\beta,\beta,\beta$ - trichlorotertiarybutyl) O - (4 - nitrophenyl) methanephosphonate product. The latter is a viscous oil having a refractive index n/D of 1.5920 at 20° C.

*Example 2.—O-(β,β,β-trichlorotertiarybutyl) O-(4-nitrophenyl) ethanephosphonate*

8.2 grams (0.046 mole) of β,β,β-trichlorotertiarybutanol and 6.6 grams (0.083 mole) of pyridine were dispersed in 50 milliliters of diethyl ether and the resulting mixture added with stirring to 11.5 grams (0.046 mole) of O-(4-nitrophenyl) ethanephosphonic chloride dispersed in 100 milliliters of diethyl ether. The mixture was thereafter heated for 2.5 hours at the boiling temperature and under reflux. At the end of this period, the reaction product was filtered and the filtrate distilled under reduced pressure to a temperature up to 90° C. to obtain as a residue an O-(β,β,β-trichlorotertiarybutyl) O-(4-nitrophenyl) ethanephosphonate product. The latter is a viscous oil having a refractive index n/D of 1.590 at 20° C.

The new O-(β,β,β-trichlorotertiarybutyl) O-(4-nitrophenyl) alkanephosphonate products are effective as parasiticides and adapted to be employed for the control of a wide range of agricultural and household pests such as flies, mites, aphids, beetles and cockroaches. For such use, the compounds may be dispersed on an inert finely divided solid and employed as a dust. Also, such mixtures may be dispersed in water with the aid of a dispersing and wetting agent and the resulting aqueous suspensions employed as sprays. In other procedures, the new products may be employed in oils, as a constituent in oil-in-water emulsions, or in water dispersion with or without the addition of emulsifying, wetting or dispersing agents. Suitable concentrations of the toxicants in dust are in the order of from about 0.1 to 10 percent by weight of the dust and in liquid suspensions from about 0.1 to 3 pounds per 100 gallons of the spray mixture. In a representative operation against Mexican bean beetles, an 80 percent kill of this organism was obtained with an aqueous spray composition containing 0.5 pound of O-(β,β,β-trichlorotertiarybutyl) O-(4-nitrophenyl) methanephosphonate per 100 gallons of spray mixture.

This is a continuation in part of my copending application Serial No. 203,755, filed December 30, 1950.

I claim:

1. An O-(β,β,β-trichlorotertiarybutyl) O-(4-nitrophenyl) alkanephosphonate of the formula

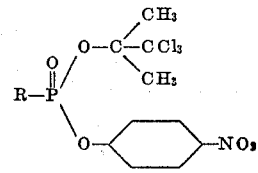

wherein R represents a member of the group consisting of methyl and ethyl.

2. O-(β,β,β-trichlorotertiarybutyl) O-(4-nitrophenyl) methanephosphonate.

3. O-(β,β,β-trichlorotertiarybutyl) O-(4-nitrophenyl) ethanephosphonate.

HENRY TOLKMITH.

No references cited.